United States Patent [19]

Lam et al.

[11] 4,398,889

[45] Aug. 16, 1983

[54] FLIGHT SIMULATOR

[75] Inventors: Wilhelmus J. Lam, Haarlem; Luitzen de Vries, Amstelveen, both of Netherlands

[73] Assignee: Fokker B.V., Schiphol, Netherlands

[21] Appl. No.: 271,220

[22] Filed: Jun. 8, 1981

[30] Foreign Application Priority Data

Nov. 7, 1980 [NL] Netherlands ............... 8006091

[51] Int. Cl.³ .......................................... G09B 9/08
[52] U.S. Cl. ...................................... 434/45; 244/223
[58] Field of Search ................. 434/45, 33, 34, 51, 434/57–59; 244/221, 223

[56] References Cited

U.S. PATENT DOCUMENTS

| | | | |
|---|---|---|---|
| 3,220,121 | 11/1965 | Cutler | 434/45 |
| 3,463,866 | 8/1969 | Staples | 434/45 |
| 3,496,651 | 2/1970 | Briguglio et al. | 434/45 |
| 4,168,045 | 9/1979 | Wright et al. | 244/221 |
| 4,228,386 | 10/1980 | Griffith | 244/223 |
| 4,236,325 | 12/1980 | Hall et al. | 434/45 |

*Primary Examiner*—Vance Y. Hum
*Assistant Examiner*—Leo P. Picard
*Attorney, Agent, or Firm*—Diller, Ramik & Wight

[57] ABSTRACT

A flight simulating system is provided with a manually operated control member connected to a servomechanism which responds to manual input by the control member and reacts to provide realistic feedback to the control member in accord with simulated flight conditions. For this purpose, a combining circuit, a dividing circuit and two integrator circuits are provided in series. The combining circuit has an input which represents manual input force to the control member and another input from the flight-simulating computer which represents simulated internal forces acting on the controlled member and the dividing circuit divides the output of the combining circuit by a value representing the mass of the control member to produce a control member acceleration-related signal. This acceleration-related signal is integrated twice to produce, respectively, a control member velocity-related signal and a control member position-related signal. These various signals are fed back to the servomechanism to provide a response which produces the correct "feel" at the control member for the flight condition under simulation.

14 Claims, 7 Drawing Figures

FLIGHT SIMULATOR

The invention relates to a flight simulator comprising (1) at least one element whose position is variable during the flight, such as a control-meber e.g. a control-column, (2) an associated, programmable servo-means coupled with the or each element, said means comprising
 (a) an amplifier
 (b) a servo-motor coupled with the output thereof,
 (c) a force-electric signal converter arranged between the servo-motor and the element and having its output coupled with a first input of the amplifier,
 (d) a position-electric signal converter arranged on the element and having its output coupled with a second input of the amplifier and
 (e) a computer calculating a force associated with the condition of the element on the basis of the flight conditions and the relevant properties of the or each element and applying a corresponding signal to the amplifier.

Such a flight simulator is known in various embodiments. In a known flight simulator three negative feedback loops are used, which have to control the position, the speed (=the first derivative of the position) and the acceleration (=second derivative of the position) of the control-member concerned, respectively.

For a good understanding of the limitations and deficiencies of this known flight simulator reference is first made to FIGS. 1 to 5.

FIG. 3 again shows the mechanical analog of the aft system.

Figure 4:
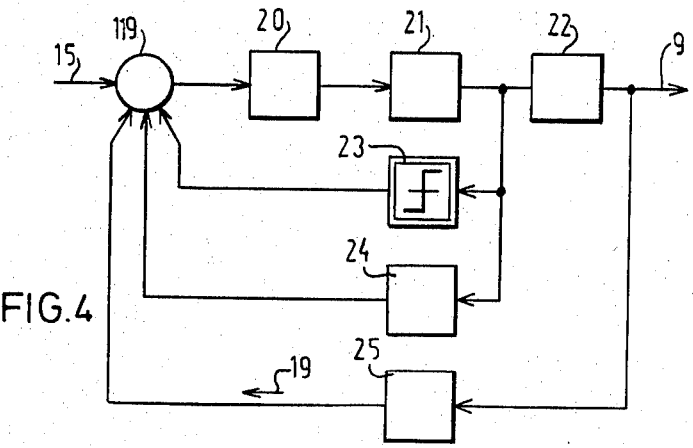

FIG. 4 is a block diagram of the part of the known flight simulator which is most important for a good understanding of the invention.

Figure 5:
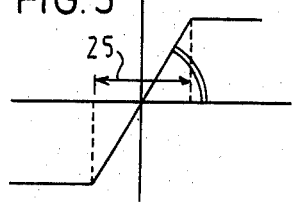

FIG. 5 illustrates the transfer function of the circuit-arrangement of FIG. 4 simulating the friction.

Figure 6:
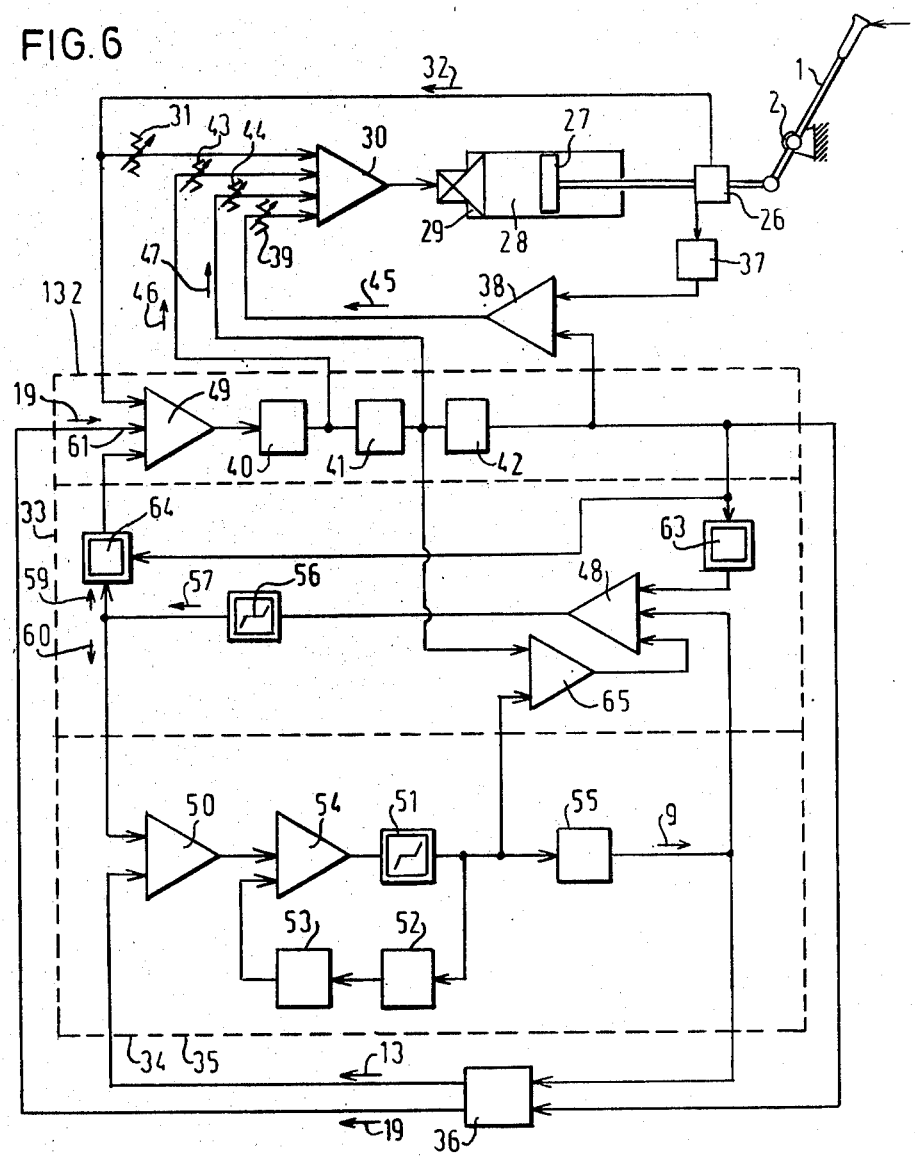

FIG. 6 is a block diagram of one embodiment of the system.

Figure 7:
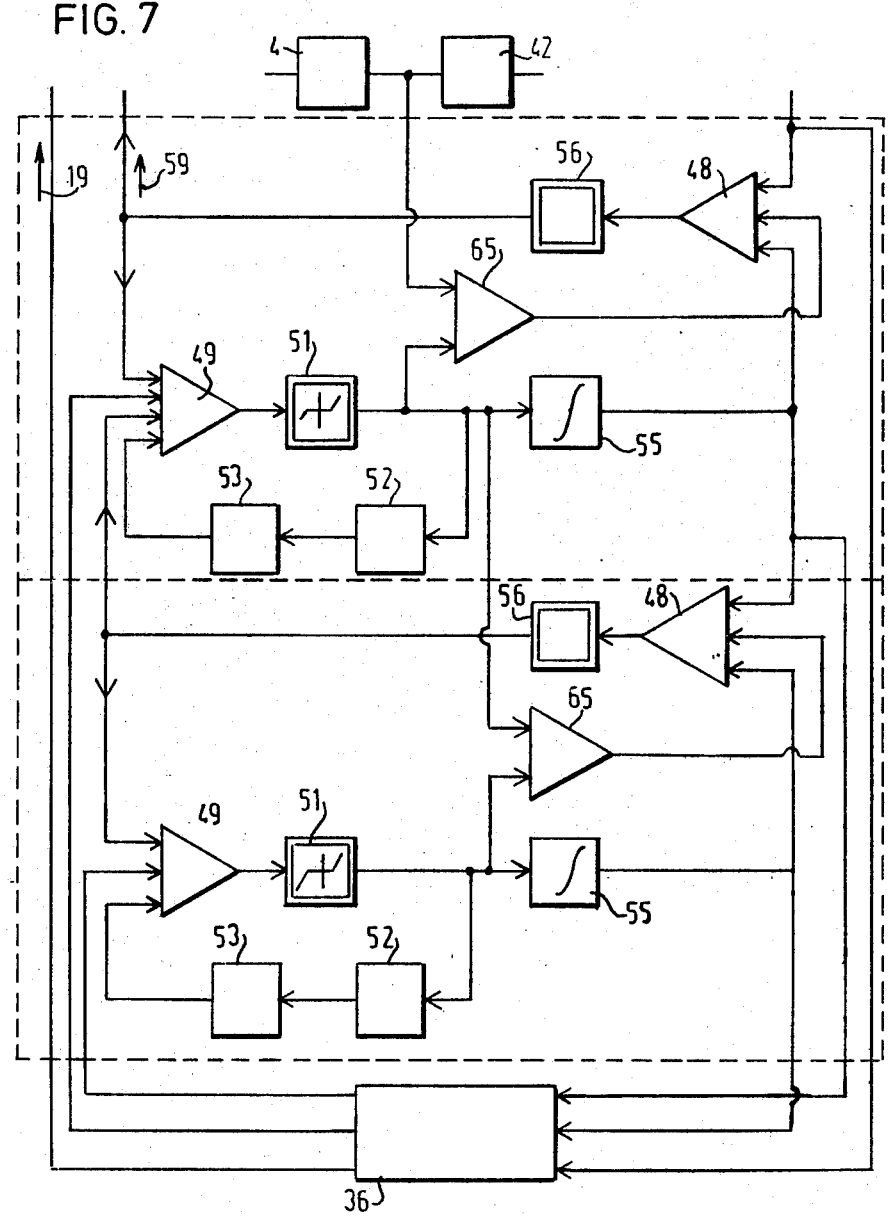

FIG. 7 is a block diagram of a modification of a portion of the system shown in FIG. 6.

Figure 1:
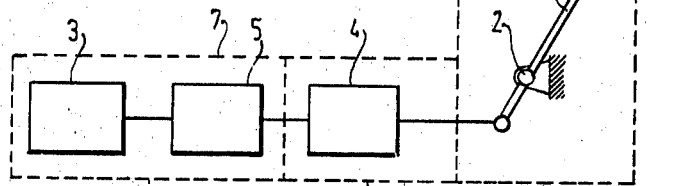
FIG. 1 is a schematic representation of a real system comprising a control-member and the element to be controlled thereby and of the set of forces occurring there between through the coupling.

The system shown in FIG. 1 comprises a control-column 1 on which a force F can be exerted around a fulcrum 2. A steering surface 3 is actuated through a coupling 4 with damping 62 consisting of rods, cables and the like and a servo-mechanism 5.

The block 6 is usually termed the "forward system" whereas the block 7 is usually termed the "aft system".

Figure 2:
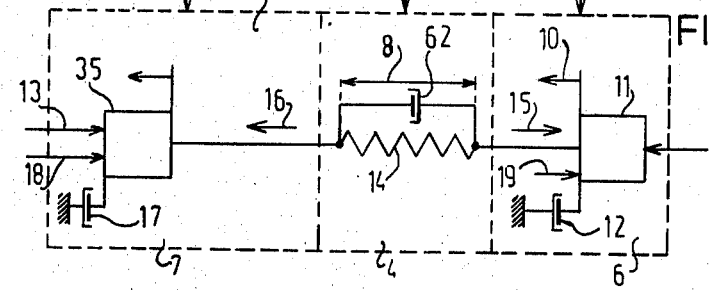
FIG. 2 shows a mechanical analog corresponding to FIG. 1, in which the set of forces is illustrated more in detail.

FIG. 2 shows the mechanical analog of the diagram of FIG. 1.

In the relationship illustrated the various elements satisfy the following equations:

$$x_c = x_2 - x_1 \tag{1}$$

$$F_1 = M_1 \ddot{x}_1 + K_{D1}\dot{x}_1 + F_{syst.1} + K_c x_c + K_{DC}\dot{x}_c \tag{2}$$

$$F_1 = F_2 \tag{3}$$

$$F_2 = M_2 \ddot{x}_2 + K_{D2}\dot{x}_2 + F_{syst.2} + F_{CF2} \tag{4}$$

$$F_{syst.2} = f(x_2, \ldots) \tag{5}$$

The various elements are designated by reference numerals. They correspond in accordance with the following list to the various physical characterizing quantities:

8 = $x_c$ = elongation or, as the case may be, depression of the coupling 4,
9 = $x_2$ = displacement of the steering surface 3,
10 = $x_1$ = displacement of the control-column 1,
11 = $M_1$ = mass of the control-column 1,
12 = $K_{D1}$ = damping coefficient of the control-column 1
13 = $F_{syst.1}$ = system forces e.g. gravity acting on $M_1$.
14 = $K_c$ = rigidity of the coupling 4
15 = $F_1$ = force exerted by the coupling 4 on $M_1$,
16 = $F_2$ = force exerted by the coupling 4 on $M_2$,
17 = $K_{D2}$ = damping coefficient,
18 = $F_{CF2}$ = frictional forces acting on $M_2$,
19 = $F_{syst.2}$ = system forces acting on $M_2$,
62 = $K_{DC}$ = damping coefficient of the coupling 4

The equations (1) to (5) provide in common a system of at least the fourth order, since the forward system and the aft system are each of at least the second order. The equations (1) to (4) need not be further explained. Equation (5) shows that $F_{syst.2}$ may be a function of other quantities than of $x_2$. In this case the order of the system may be higher and even much higher than 2.

Figure 3:
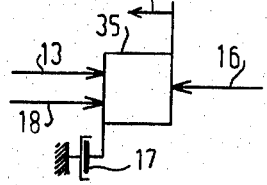

Referring to FIG. 3 equation (4) is rewritten as follows:

$$\ddot{x}_2 = (F_2 - K_{D2}\dot{x} - F_{syst.2} - F_{CF2})/M_2 \tag{4a}$$

It furthermore applies:

$$\dot{x}_2 = \int \ddot{x}_2 dt \tag{6}$$

$$x_2 = \int \dot{x}_2 dt = \int \int \ddot{x}_2 dt dt \tag{7}$$

$$F_{CF2} = K_{CF2}(\dot{x}_2/|\dot{x}_2|) \tag{8}$$

The equations (6) and (7) are self-explanatory. In the equation (8) $K_{CF2}$ is the column frictional force. Equation (8) shows that the direction of said force is invariably opposite the direction of movement even for very low speeds.

In a static situation it now applies:

$$|F_2 - F_{syst.}| \leq |F_{CF2}| \tag{9}$$

and $$x_2 = 0 \tag{10}$$

$$\dot{x}_2 = 0 \tag{11}$$

$$\ddot{x}_2 = 0 \tag{12}$$

FIG. 4 shows a known simulation of a second order system with column friction.

The input signal corresponds to the force $F_2$ designated by 15. The output signal corresponds to the position $x_2$ designated by numeral 9. The force signal 15 is applied to a combining circuit 119, the output of which is connected to the input of a divider 20, which divides its input signal by the mass $M_2$. The output of the divider 20 is connected to the input of a first integrator 21, the output of which is connected to the input of a second integrator 21. The output of the first integrator 22 is connected to a first negative feedback circuit 23 and a second negative feedback circuit 24, the outputs of said negative feedback circuits being each connected to an inverting input of the combining circuit 119. The circuit 23 represents the friction and has, for this purpose, a transfer characteristic such that at a positive input signal of any magnitude a fixed, positive output signal is obtained and at a negative input signal of any magnitude a negative output signal of the same, predetermined magnitude is obtained. The second negative feedback circuit 24 represents the viscous damping. The output of the second integrator 22 is connected to an input of a computer 25, the output of which is connected to an inverting input of the combining circuit 119. At an output of the computer $F_{syst.2}$ reference 19 is available.

It should be noted that the mass $M_2$ in the system of FIG. 4 must not become zero. The boundary conditions for the integrators 21 and 22 are chosen to be zero. The damping $K_{D2}$ represented by the second negative feedback circuit 24 is allowed to become zero.

In the frame of the first negative feedback circuit 23 is represented the transfer function. This transfer function implies an infinitely high amplification factor. Due to the limitations imposed on the amplification factor the transfer function exhibits deviations from the ideal form represented. FIG. 5 shows a realistic example of the transfer function. The result of this transfer function of FIG. 5 is that the simulated Coulomb friction behaves within the region indicated by 25 like a damping term. Attention is drawn to the fact that exactly in the region around zero value the subjective observation of the friction is dominating for the realistic simulation.

A further, extremely important consequence of the transfer function of FIG. 5, is that the stabilized final value of $x_2$ always becomes zero when $F_2=0$. Consequently the equations (9) to (12) cannot be satisfied.

From the foregoing description of a representative example of the prior art there can be inferred a number of limitations and deficiencies.

It appears not to be possible with the aid of the known technology to obtain sufficiently realistic simulations for very weak forces around zero value, since for this purpose an infinitely high amplification factor would be necessary. In the event of very weak forces static rigidities and frictions have to be taken into account. In the event of very low speeds dynamic phenomena have to be considered, which include inter alia force variations, masses, damping. For a subjective, realistic system they have to be approximated by a higher order than 2, which is the value to which the flight simulator according to the prior art is limited.

It furthermore appears that the known system is not sufficiently capable of suppressing, for example, by compensation, interferences generated in the system. For example, in order to compensate for noise interferences by negative feedback in the servo-motor, for example, a linear hydro-motor, a high, open-loop amplification is required, which readily gives rise to instability.

The invention has for its object to provide a flight simulator for a perfectly faithful simulation of all practical systems without imposing limitations to the order of the system to be simulated.

The invention furthermore has for its object to provide a flight simulator free of stability problems irrespective of the order of the system.

The invention furthermore provides a flight simulator whose effective bandwidth is at least equal to that of a flight simulator according to the prior art.

In order to achieve the aforesaid objects the invention proposes a flight simulator of the type set forth in the preamble having the particular feature that the computer is coupled with the amplifier through an analog representing the relevant mechanical properties of the element concerned.

The electric analog preferably comprises
(1) a divider for dividing the input signal by a value proportional to the mass of the element,
(2) a first integrator connected to the output of the divider and
(3) a second integrator connected to the output of the first integrator, the output of the former being coupled with the input of the amplifier.

The output of the divider and/or that of the first integrator may, moreover, be coupled with the amplifier.

The flight simulator according to the invention may be characterized by a difference amplifier, one input of which is coupled with the position-electric signal converter, the other input of which is coupled with the output of the second integrator and the output of which is coupled with an input of the amplifier.

A preferred embodiment of the simulator according to the invention is characterized by
(1) a first combining circuit, a first input of which is connected to the output of the second integrator,
(2) a third combining circuit, one input of which is connected to the output of the first combining circuit and the second input of which is connected to the output of the computer,
(3) a second order circuit, whose input is connected to the output of the third combining circuit and whose output is connected to the input of the computer and to a second input of the first combining circuit,
as well as a second combining circuit whose output is connected to the input of the divider and whose first input is connected to the power electric signal converter, whilst a second input is connected to the output of the first combining circuit.

A very faithful simulation of the friction characteristics of an element to be controlled is obtained by a flight simulator whose second order circuit comprises a simulation circuit which only provides an output signal when the absolute value of the input signal exceeds a predetermined value, the sign of the output signal being uniquely related with the sign of the input signal and when the preselected value corresponds to a static friction. This simulation circuit may have a negative feedback loop comprising a differentiator.

For enhancing the system to any desired order the flight simulator according to the invention may be characterized by a cascade connection of units of the type set forth so that the order of the system is equal to twice the number of cascaded units.

The non-linearities described are required for the faithful simulation of non-linear mechanical phenomena. Reference may be made to the conversion of a linear movement into a rotary movement or conversely or to conversions by a scissor- or rod-construction. The non-linear phenomena may be expressed in terms of transfer functions with dead bands, limitations, stepwise transistions and/or curvatures.

The invention will now be described more fully with reference to FIGS. 6 and 7.

FIG. 6 shows an embodiment of a fourth order flight simulator in accordance with the invention. The pilot exerts a force F on the control-column 1, which is coupled through the fulcrum 2 and a power pick-up 26 with the piston 27 of the linear hydraulic motor 28, the servo-valve 29 of which can be controlled from the amplifier 30. The force-electric signal converter 26 is connected through a potentiometer 31 to an inverting input of the amplifier 30. Without further explanation it will be obvious that the loop described constitutes a force-servo-loop or a force-negative feedback loop. The force pick-up 26 provides a signal 32 corresponding to the measured force. In this way static load errors which may be due to the compressibility of the oil employed are corrected. The signal 32 is also applied to a block 132 representing an electrical analog or substitute diagram of the forward system 6.

As will be described in further detail the analog 132 is connected with an analogon 33 representing the properties of the coupling 4. This analog 33, in turn, is connected with an analog 34 representing the properties of the aft system 7. It should be emphasized that the analog 34 may be formed by a number of blocks 35 corresponding to the order of the aft system to be simulated, each block representing in itself a second order system as will be discussed hereinafter with reference to FIG. 7. Thus, by cascading any desired order of the aft system can be obtained. The "lower" block 35 of the analog 34 is connected to a computer 36, which serves for the simulation of the flight conditions.

With the control-column 1 is furthermore coupled a position-electric signal converter 37, the output of which is connected through an amplifier 38 and a potentiometer 39 to an input of the amplifier 30.

The analog 132 of the forward system comprises a divider 40 for dividing the input signal by a value proportional to the desired mass of the control column, a first integrator 41 connected to the output of the divider 40 and a second integrator 42 connected to the output of the first integrator, the output of said second integrator being connected through the amplifier 38 and the potentiometer 39 to an input of the amplifier 30. In the present embodiment the output of the divider 40 and the output of the integrator 41 are also coupled with the inputs of the amplifier 30, that is to say, through potentiometers 43 and 44, respectively. The output signal 45 of the amplifier 38 corresponds, as will be evident after the foregoing, to the difference between the desired and the measured positions of the control-column 1. The signals 46 and 47 applied to the potentiometers 43 and 44 respectively serve to stimulate a quick response to changes of the system.

The coupling analogon 33 is constructed in the form of a first combining circuit 48, the first input of which is connected through a non-linear circuit 63 to the output of the second integrator 42. The analogon 132 comprises a second combining circuit 49, the output of which is connected to the input of the divider 40 and a first input of which is connected to the force-electric signal converter 26 and a second input of which is connected to the output of the first combining circuit 48. The output of the first combining circuit 48 is connected through a non-linear simulation circuit 56 corresponding to the circuit 51 to be described hereinafter to the third combining circuit 50 and through a second, non-linear circuit 64 controllable by the output signal of the second integrator to the second combining circuit 49.

The unit 35 comprises a third combining circuit 50, one input of which is coupled with the output of the first combining circuit 48 and the second input of which is connected to the output of the computer 36 and a second order circuit, the input of which is connected to the output of the third combining circuit 50 and the output of which is connected to an input of the computer and a second input of the first combining circuit.

The said second order circuit comprises a simulation circuit 51, which only provides an output signal when the absolute value of the input signal exceeds a preselected value, whilst the sign of the output signal is uniquely related with the sign of the input signal and said preselected value corresponds to a static friction. The simulation circuit 51 comprises a negative feedback circuit formed by a differentiator 52, an adjustable amplifier 53 and a difference amplifier 54. With regard to the transfer function of the simulation circuit it is noted that the dead band and the slope are both independently adjustable. The dead band corresponds to the static friction and the slope to the reciprocal value of the damping.

The attenuator 53 serves to setting the mass $K_2$ of the steering surface. The output of the simulation circuit 51 is connected to the input of an integrator 55, the output of which is coupled with said input of the computer and with said second input of the first combining circuit 48.

The output signal of the second integrator 42 is furthermore applied to a further input of the computer 36. A further output of the computer provides $F_{syst.2}$ 19, which signal is applied through the input 61 to the second combining circuit 49.

In anticipation of the discussion of FIG. 7, it is now noted with respect to the connection between the second integrator 42 and the computer 36 that to the computer are applied in general various "ideal" i.e. desired or calculated position signals, that is to say, not from, for example, the position pick-up 37, since the latter provides a realistic, non-ideal position signal. The signal 9 at the output of the integrator 55 is also such a signal, that is to say, the "position" of the analog 34,35.

The two inputs of a fourth combining circuit 65 are connected to the output of the first integrator 41 and to the output of the simulation circuit 51 respectively, whilst the output is connected to an input of the first combining circuit 48. The amplification of the circuit 65, which may be adjustable, represents the damping of the coupling.

At the output of the non-linear circuit 56 is available a signal 57 which corresponds to the force $F_1 = F_2$. This signal may be imagined to be split up from the branching 58 into a signal 59 corresponding to $F_1$ and an identical signal 60 corresponding to $F_2$.

In the present embodiment the second combining circuit 49 is provided with a further input 61, to which the computer 36 can apply a signal 19 corresponding to $F_{syst.1}$. The signal 9 at the output of the integrator 55 corresponds to $x_2$. The signal 13 at the output of the computer 36 corresponds to $F_{syst.2}$. The signal 9 corresponds to the position of the analogon, that is to say, to the desired position of the control-column.

FIG. 7 shows by way of example a cascading of two second order blocks constituting together a fourth order analogon of the aft system 7.

In view of the elaborate explanation of the lower order system shown in FIG. 6, it may be sufficient to refer to the example of FIG. 7. With the aid thereof it will be apparent how a further enhancement of the order of the system can be obtained.

It is noted that the various units of FIG. 7 are designated by the same reference numerals as in FIG. 6. This intends to mean that units having the same reference numerals electrically behave in the same manner. There may, however, be differences of adjustment, for example, of amplification factors, dead bands, dividing ratios.

It is emphasized that the flight simulator according to the invention satisfies all equations mentioned above, also those expressing the Coulomb friction. In this way the invention provides a perfectly faithful simulation of all relevant mechanical system properties including friction, and this for any desired order of the system to be simulated.

We claim:

1. A flight simulator comprising:
   a flight-simulation computer,
   at least one control-element,
   servo-means coupled with the or each element and including an amplifier, said computer being coupled with the amplifier through an electric analog representing the relevant mechanical properties of the element concerned, characterized in that the electric analog comprises:
   a divider for dividing its input signal by a value proportional to the desired mass of the element, the output of said divider being coupled with a third input of said amplifier,
   a first integrator connected to the output of the divider, and
   a second integrator connected to the output of the first integrator, the output of said second integrator being coupled with the input of the amplifier.

2. A flight simulator as claimed in claim 1 characterized in that the output of the first integrator is coupled with the amplifier.

3. A flight simulator as claimed in claim 1 characterized by at least one unit comprising
   (1) a first combining circuit, the first input of which is connected to the output of the second integrator,
   (2) a third combining circuit, one input of which is connected to the output of the first combining circuit and the second input of which is connected to the output of the computer,
   (3) a second order circuit, the input of which is connected to the output of the third combining circuit and the output of which is connected to an input of the computer and to a second input of the first combinding circuit,
as well as a second combining circuit, the output of which is connected to the input of the divider and a first input of which is connected to the force-electric signal converter and a second input of which is connected to the output of the first combining circuit.

4. A flight simulator as claimed in claim 3 characterized in that the output of the first combining circuit is coupled with said input of the second combining circuit through a variable, non-linear element having a control-input coupled with at least one of the inputs of the first combining circuit.

5. A flight simulator as claimed in claim 4 characterized in that the output of the second integrator is coupled with the input of the first combining circuit through a non-linear element.

6. A flight simulator as claimed in claim 5 characterized in that the first combining circuit comprises a non-linear element.

7. A flight simulator as claimed in claim 6 characterized by a fourth combining circuit having an adjustable amplification factor, one input of which is coupled with the output of the first integrator, the second input with the output of the simulation circuit and the output with an input of the first combining circuit.

8. A flight simulator as claimed in claim 3 characterized in that the second order circuit comprises a simulation circuit, whose amplification factor may be adjustable, said circuit providing an output signal only when the absolute value of the input signal exceeds a preselected value, the sign of the output signal being uniquely related with the sign of the input signal said preselected value corresponding to a static friction.

9. A flight simulator as claimed in claim 8 characterized in that the simulation circuit is provided with a negative feedback loop formed by the series circuit of a differentiator and an amplifier, which may be adjustable.

10. A flight simulator as claimed in claim 8 or 9 characterized by an integrator, the input of which is coupled with the output of the simulation circuit and the output of which is coupled with said input of the computer and said second input of the combining circuit.

11. A flight simulator as claimed in claim 10 characterized by a cascade arrangement of units of said type in which the order of the system is equal to at the most twice the number of cascaded units.

12. In a flight simulator system which includes a manually operated control member and a servo means connected thereto for acting and reacting on said control member to simulate response of a controlled member such as a control surface under simulated flight conditions, said servo means including a servo valve, the combination of:
   amplifier means for controlling said servo valve in response to a plurality of inputs thereto;
   computer means for producing flight simulating signals;
   electrical analog means for producing output signals feeding said amplifier means, and including a combining circuit, a divider and first and second integrators, all in series, said combining circuit having an input from said computer means which represents simulated inertial forces acting on said controlled member and an input which represents manual input force applied to said control member, said divider dividing the output of said combining circuit by a value representing the mass of said control member to produce a control member acceleration-related signal applied to said first integrator whereby the output of said first integrator is a control member velocity-related signal and the output of said second integrator is a control member position-related signal, said acceleration-related signal and said velocity-related signal being connected as inputs to said amplifier means and said position-related signal being applied to said amplifier means as a control member position error signal.

13. In a flight simulator system as defined in claim 12 including further electrical analog means for compensating friction and damping in the control member system, said further electrical analog means including a further combining circuit and a further amplifier, said further amplifier having said velocity-related signal as an input and providing a damping-compensated input to said further combining means, another input to said further combining means being derived from said position-related signal, and means responsive to the output of said further combining means for providing a friction-compensating input to the combining means first mentioned.

14. In a flight simulator system as defined in claim 13 including at least one further electrical analog means for providing an input to said further combining means and to said computer means which is representative of simulated movement imparted to the controlled member.

* * * * *